United States Patent
Broyles et al.

(10) Patent No.: US 8,228,819 B1
(45) Date of Patent: Jul. 24, 2012

(54) NETWORK DESIGN BY HUB AND REMOTE SELECTION

(75) Inventors: Daniel S. Broyles, Olathe, KS (US); Christophe Roux, Ermont (FR)

(73) Assignee: Sprint Communications Company L.P., Overland Park, KS (US)

( * ) Notice: Subject to any disclaimer, the term of this patent is extended or adjusted under 35 U.S.C. 154(b) by 1104 days.

(21) Appl. No.: 12/121,874

(22) Filed: May 16, 2008

(51) Int. Cl.
*H04L 12/28* (2006.01)
*G06F 15/177* (2006.01)

(52) U.S. Cl. ............. 370/254; 370/401; 709/221
(58) Field of Classification Search .......... None
See application file for complete search history.

(56) References Cited

U.S. PATENT DOCUMENTS

| | | | |
|---|---|---|---|
| 5,285,494 A | 2/1994 | Sprecher et al. | |
| 6,393,290 B1 | 5/2002 | Ufongene | |
| 6,477,376 B1 | 11/2002 | Carter | |
| 6,636,739 B1 | 10/2003 | Fagen et al. | |
| 2007/0077933 A1 | 4/2007 | El-Sayed et al. | |
| 2008/0186873 A1* | 8/2008 | Pujet et al. | 370/254 |
| 2009/0109868 A1* | 4/2009 | Chen et al. | 370/254 |

OTHER PUBLICATIONS

Fibertower Corporation, "A New Evolution in Wireless Backhaul," May 15, 2008, 2 pages, FiberTower Corporation, San Francisco, California, http://www.fibertower.com/corp/index.shtml.
Fibertower Corporation, "FiberTower Announces Backhaul Agreement with Sprint Nextel for WiMAX Buildout," Aug. 1, 2007, 2 pages, FiberTower Corporation, San Francisco, California, http://www.fibertower.com/corp/news-press-releases-080107.shtml.
Dan O'Shea, "FiberTower Targets Backhaul," Mar. 14, 2005, 1 page, Telephony Online, http://telephonyonline.com/mag/telecom_fibertower_targets_backhaul/index.html.

* cited by examiner

*Primary Examiner* — Melanie Jagannathan

(57) ABSTRACT

Site location information is received for a first list of sites. Eligible remote information is received for the first list of sites. Hub scores are generated for the sites. A first hub is selected based the hub scores. Remote sites are assigned the first hub. A system for generating a backhaul design is disclosed. A hub score generator that generates hub scores for a list of sites. A hub selector selects hubs based on the hub scores. A remote selector assigns remotes to the hubs.

15 Claims, 8 Drawing Sheets

NETWORK DESIGN BY HUB AND REMOTE SELECTION

TECHNICAL BACKGROUND

New broadband wireless services and technologies have been developed and are being deployed. One such broadband technology is the Worldwide Interoperability for Microwave Access (a.k.a., WiMAX). The WiMAX specified standards include point-to-point links and full mobile cellular type access. WiMAX is based on the IEEE 802.16 set of standards. Another wireless broadband technology example is Third Generation Partnership Project (3GPP) Long Term Evolution (LTE). LTE is the name given to a project within the 3GPP to improve the Universal Mobile Telecommunications System (UMTS) mobile phone standard to cope with future requirements. Yet another wireless broadband technology example is Ultra Mobile Broadband (UMB).

In broadband wireless communication systems, voice and data traffic is backhauled from each base station to central offices for routing and switching. Backhaul links are typically leased from Local Exchange Carriers (LECs). Because the new broadband services and technologies carry more traffic than the old technologies, the bandwidth of the backhaul links must be increased to accommodate the increased traffic. This is leading some telecommunications companies to redesign their backhaul networks.

Overview

A method of selecting network hubs and aggregating remotes is disclosed. Site location information is received for a first list of sites. Eligible remote information is received for the first list of sites. Hub scores are generated for the sites. A first hub is selected based the hub scores. Remote sites are assigned the first hub.

A system for generating a backhaul design is disclosed. A hub score generator that generates hub scores for a list of sites. A hub selector selects hubs based on the hub scores. A remote selector assigns remotes to the hubs.

DETAILED DESCRIPTION

The method and system disclosed design a network backhaul arrangement and site traffic aggregation by determining whether a wireless base station site should be a hub, a remote, or a daisy-chain. A hub is a site where traffic is aggregated from a number of remote sites and placed on a backhaul link. Remote sites are those sites that exchange traffic with only a hub or daisy-chain. In other words, remote sites exchange data with hubs via a single hop. A daisy-chain site is one that exchanges traffic with a hub and a minimum non-zero number of remote sites (e.g., one). In other words, daisy chain sites use more than one hop to exchange data with a hub because the data to/from a daisy chain site must pass through a remote site on its way to/from a hub.

Hubs typically aggregate the traffic from several remotes or daisy-chains. As part of the design, remote sites and daisy-chain sites may be assigned to hubs. It is the traffic from the remotes and daisy-chains assigned to a particular hub that the network design aggregates at a particular hub.

Typically, daisy-chains and remotes exchange traffic via point-to-point wireless links. These wireless links do not need to be leased from a LEC. Thus, by designing a network that aggregates traffic exchanged with remotes and daisy-chains at hubs, the number of dedicated backhaul links leased from the LEC may be minimized. This reduces the overall cost of operating the network.

Figure 1:
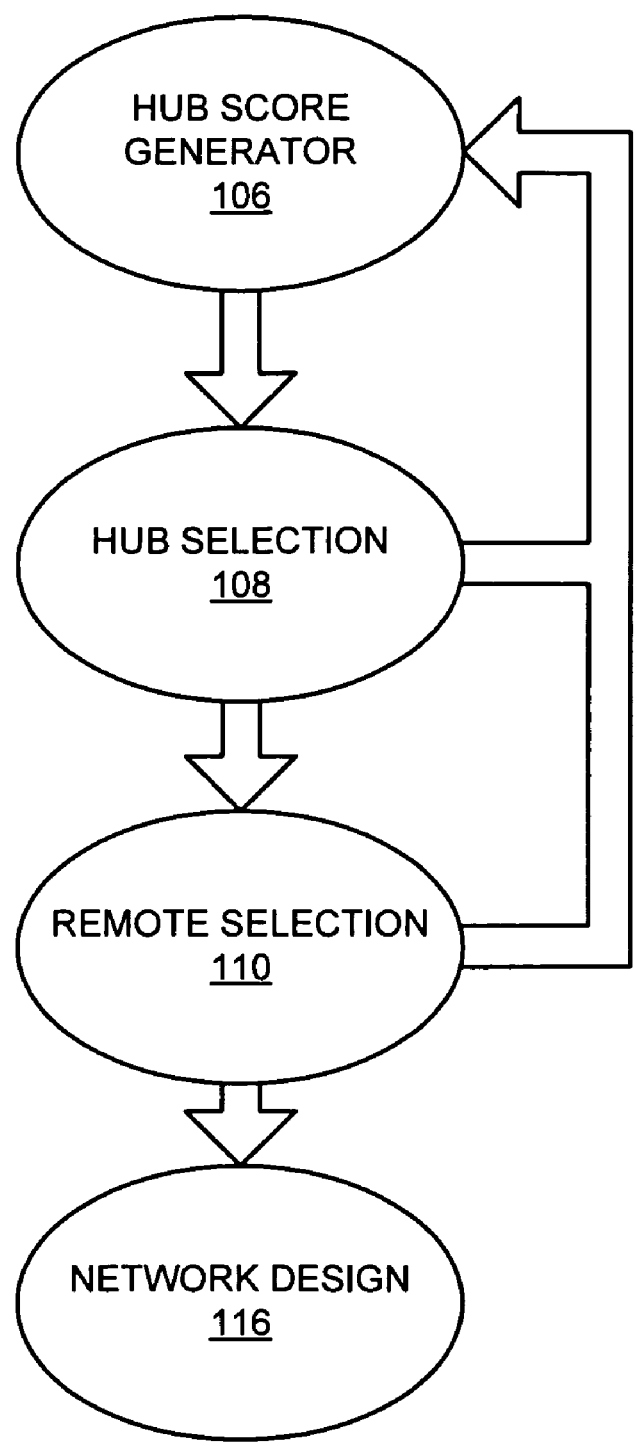
FIG. 1 is a block diagram illustrating a system for generating a backhaul design.

FIG. 1 is a block diagram illustrating a system for generating a backhaul design. Design system 100 comprises hub score generator 106, hub selection 108, remote selection 110, and network design 116.

Hub score generator 106 receives site information. The site information may include location, traffic forecast, tower configuration, whether a site has already been selected as either a hub or a remote, and so on. Hub score generator 106 also receives eligible remote information. The eligible remote information may include what other sites can be seen from a particular site (e.g., line of sight information), propagation information, and whether a particular site has already been selected as either a hub or remote. The eligible remote information includes information that determines which sites are eligible to be a remote to other sites. This determination is influenced by distance, clutter, RF frequency of operation, technology, and expected traffic demands.

The hub score generator 106 generates hub scores for each site based on the received site location information and eligible remote information. The hub score for a particular site is based on a weighted sum of factors. These factors may include a number of eligible remotes factor, a total distance to hub factor, a coverage continuity factor, a daisy-chain score, and so on.

To illustrate, consider a case of a hub candidate where: (a) the total number of eligible remotes for the hub candidate is A; (b) the total distance from the candidate hub to the N closest eligible remotes is B; (c) the number of unique hubs with remotes that are in range (e.g., would have been eligible remotes but have been removed from consideration) of the candidate hub is C; and (d) at least one of the eligible remotes has a daisy-chain score that is D. In this case, the hub score (S) for this candidate hub may be calculated as $S=(W*A)+(X*B)+(Y*C)+(Z*D)$ where W, X, Y, and Z are weighting factors. The weighting factors W, X, Y, and Z are chosen, perhaps by trial and error, to generate a desirable network design. The process of generating a hub score is repeated for all of the hub candidates being considered as possible hubs so that each site under consideration is given a hub score.

Hub selection 108 receives the hub scores from hub score generator 106. Hub selection 108 chooses a site to be a hub based on the hub scores. For example, hub selection 108 may choose the hub with the highest hub score to be the next hub.

Remote selection 110 receives the selected hub from hub selection 108. Remote selection 110 also receives eligible remote information for at least the selected hub. Remote selection 110 assigns remotes to the selected hub. For example, remote selection may assign a minimum of M sites closest to the selected hub to be remotes (where M is an arbitrary integer number such as 4). These remote sites may be selected from a list of eligible remotes for the selected hub.

Remote selection 110 may also limit the number of remotes it assigns to the selected hub. For example, a list of eligible remotes for the selected hub may contain fifteen sites. However, there may not be enough room at the selected hub for fifteen antennas or other equipment. In this case, remote selection may limit the number of remotes it assigns to the selected hub to a predetermined maximum. The selected hub and the assigned remotes are added to network design 116.

Once remote selection 110 assigns remotes to the selected hub, the selected hub and the assigned remotes are no longer considered as candidates to be a hub or a remote. This information is received by hub score generator 106. For example, site location information and eligible remote information may be updated to remove the selected hub and the assigned remotes from the hub score generation process. The hub score generator 106 generates hub scores for each site still under consideration based on the site location information and the eligible remote information.

Figure 2:
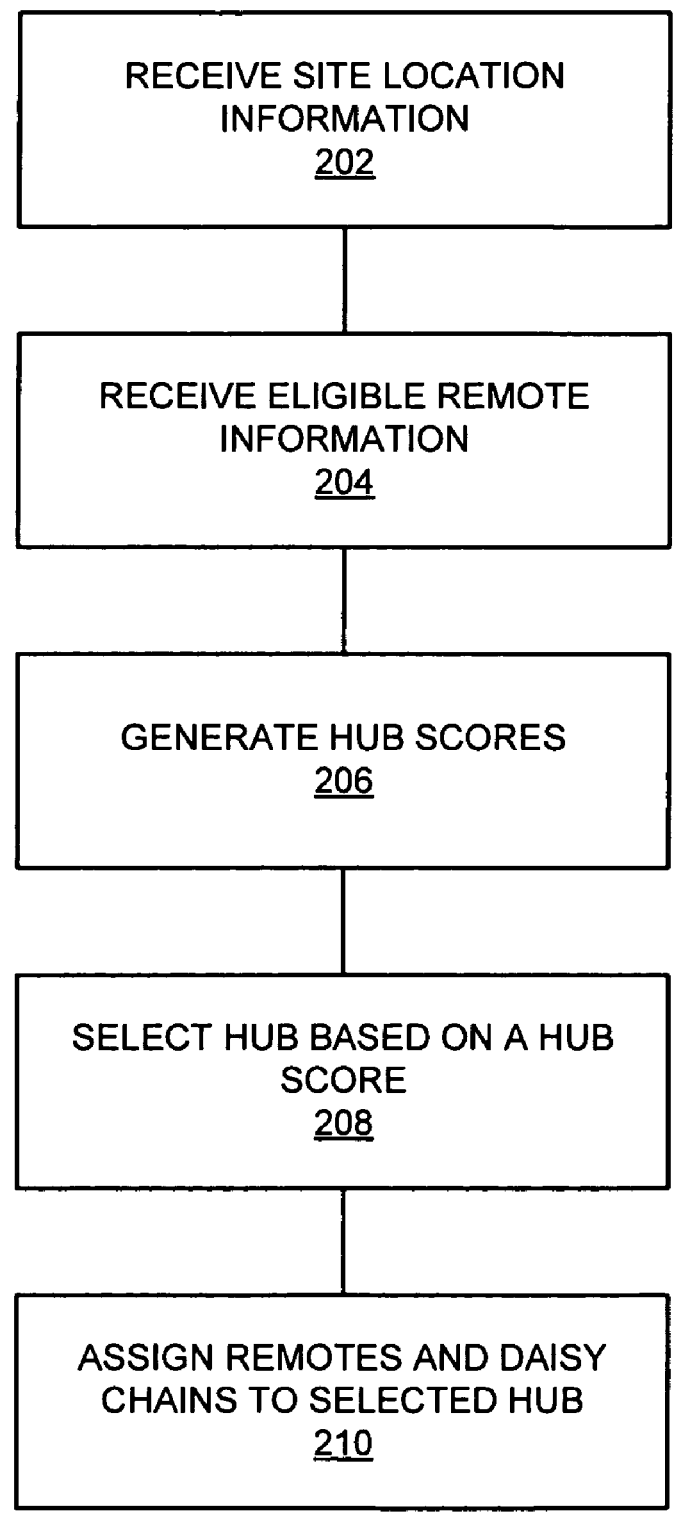
FIG. 2 is a flowchart illustrating a method of selecting hubs and remotes.

FIG. 2 is a flowchart illustrating a method of selecting hubs and remotes. This method may be performed by design system 100 to produce network design 116. Site location information is received (202). The site information may include location, traffic forecast, tower configuration, whether a site has already been selected as either a hub or a remote, and so on. Eligible remote information is received (204). The eligible remote information may include what other sites can be seen from a particular site (e.g., line of sight information), propagation information, and whether a particular site has already been selected as either a hub or remote. The eligible remote information includes information that determines which sites are eligible to be a remote to other sites. This determination is influenced by distance, clutter, RF frequency of operation, technology, and expected traffic demands.

Hub scores are generated (206). Hub scores for each site are based on the received site location information and eligible remote information. The hub score for a particular site is based on a weighted sum of factors. These factors may include a number of eligible remotes factor, a total distance to hub factor, a coverage continuity factor, a daisy-chain score, and so on.

To illustrate, consider a case of a site where: (a) the total number of eligible remotes for this site is A; (b) the total distance from the site to the N closest eligible remotes is B; (c) the number of unique hubs with remotes that are in range of the site is C; and (d) at least one of the eligible remotes has a daisy-chain score that is D. In this case, the hub score (S) for this site may be calculated as $S=(W*A)+(X*B)+(Y*C)+(Z*D)$ where W, X, Y, and Z are weighting factors. The weighting factors W, X, Y, and Z are chosen to generate a desirable network design. The process of generating a hub score is repeated for all of the sites being considered as possible hubs so that each site under consideration is given a hub score.

A hub is selected based on a hub score (208). For example, the site with the highest hub score may be selected to be the next hub. Remotes and daisy chains are assigned to the selected hub (210). For example, a minimum number of sites closest to the selected hub may be assigned to be remotes of the selected hub. These remote sites may be selected from a list of sites that are eligible to be remotes of the selected hub.

The number of remotes that are assigned to the selected hub may be limited. For example, there may be fifteen sites that are eligible to be remotes of the selected hub. However, there may not be enough room at the selected hub for fifteen antennas or other equipment. In this case, the number of remotes that are assigned to the selected hub may be limited to a predetermined maximum. Any or all of the steps illustrated in FIG. 2 may be repeated to select additional hubs and remote sites.

Figure 3:
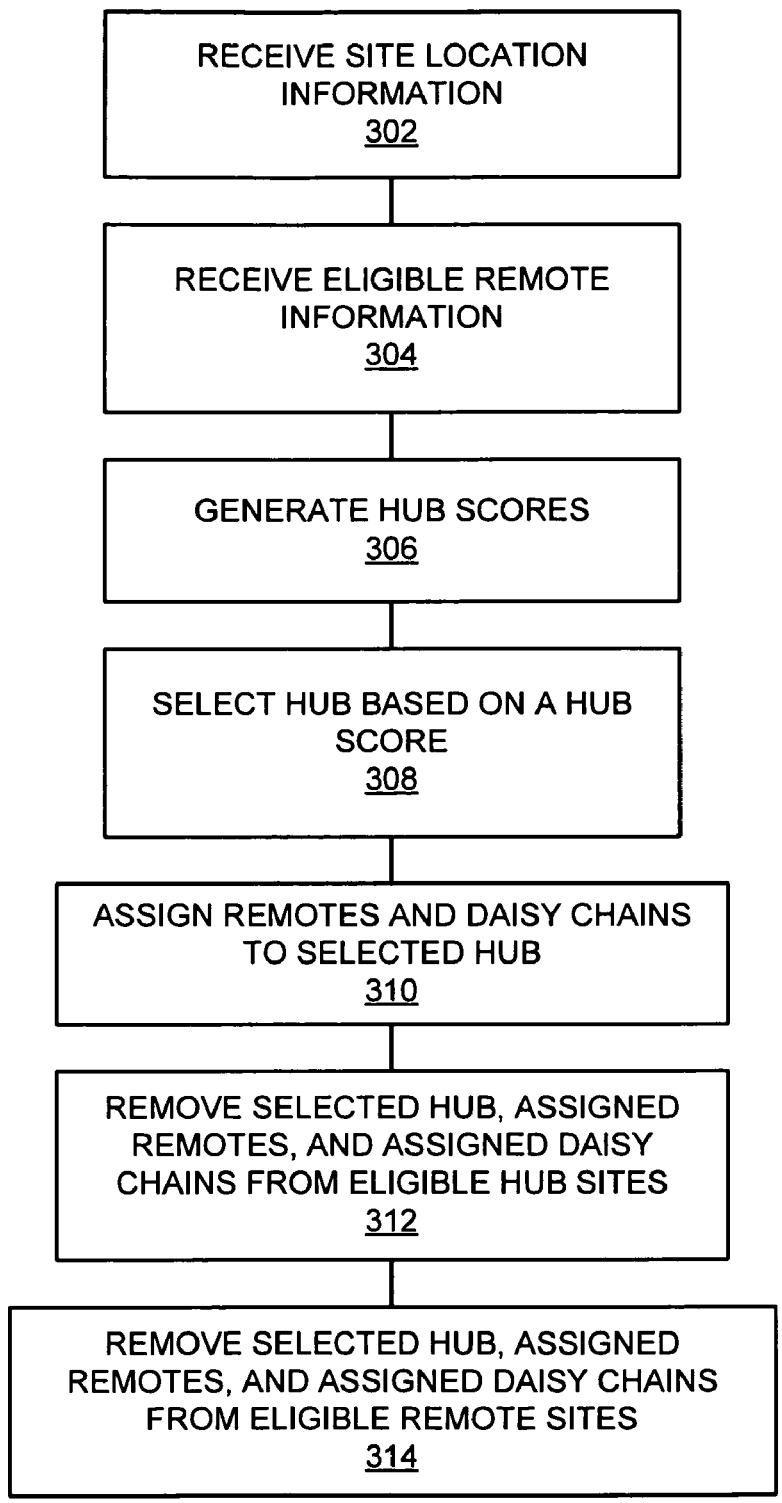
FIG. 3 is a flowchart illustrating a method of selecting hubs and remotes.

FIG. 3 is a flowchart illustrating a method of selecting hubs and remotes. This method may be performed by design system 100 to produce network design 116. Site location information is received (302). The site information may include location, traffic forecast, tower configuration, whether a site has already been selected as either a hub or a remote, and so on. Eligible remote information is received (304). The eligible remote information may include what other sites can be seen from a particular site (e.g., line of sight information), propagation information, and whether a particular site has already been selected as either a hub or remote. The eligible remote information includes information that determines which sites are eligible to be a remote to other sites. This determination is influenced by distance, clutter, RF frequency of operation, technology, and expected traffic demands.

Hub scores are generated (306). Hub scores for each site are based on the received site location information and eligible remote information. The hub score for a particular site is based on a weighted sum of factors. These factors may include a number of eligible remotes factor, a total distance to hub factor, a coverage continuity factor, a daisy-chain score, and so on.

To illustrate, consider a case of a site where: (a) the total number of eligible remotes for this site is A; (b) the total distance from the site to the N closest eligible remotes is B; (c) the number of unique hubs with remotes that are in range of the site is C; and (d) at least one of the eligible remotes has a daisy-chain score that is D. In this case, the hub score (S) for this site may be calculated as $S=(W*A)+(X*B)+(Y*C)+(Z*D)$ where W, X, Y, and Z are weighting factors. The weighting factors W, X, Y, and Z are chosen to generate a desirable network design. The process of generating a hub score is repeated for all of the sites being considered as possible hubs so that each site under consideration is given a hub score.

A hub is selected based on a hub score (308). For example, the site with the highest hub score may be selected to be the next hub. Remotes and daisy chains are assigned to the selected hub (310). For example, a minimum number of sites closest to the selected hub may be assigned to be remotes of the selected hub. These remote sites may be selected from a list of sites that are eligible to be remotes of the selected hub.

The number of remotes that are assigned to the selected hub may be limited. For example, there may be fifteen sites that are eligible to be remotes of the selected hub. However, there may not be enough room at the selected hub for fifteen antennas or other equipment. In this case, the number of remotes that are assigned to the selected hub may be limited to a predetermined maximum.

The selected hub, assigned remotes, and assigned daisy chains are removed from consideration as eligible hub sites (312). For example, the selected hub, assigned remotes, and assigned daisy chains may be removed from a list of eligible hub sites that was received as part of the site location information.

The selected hub, assigned remotes, and assigned daisy chains are removed from consideration as eligible remote sites (314). For example, the selected hub, assigned remotes, and assigned daisy chains may be removed from a list of eligible remote sites that was received as part of the eligible remote information.

Figure 4:
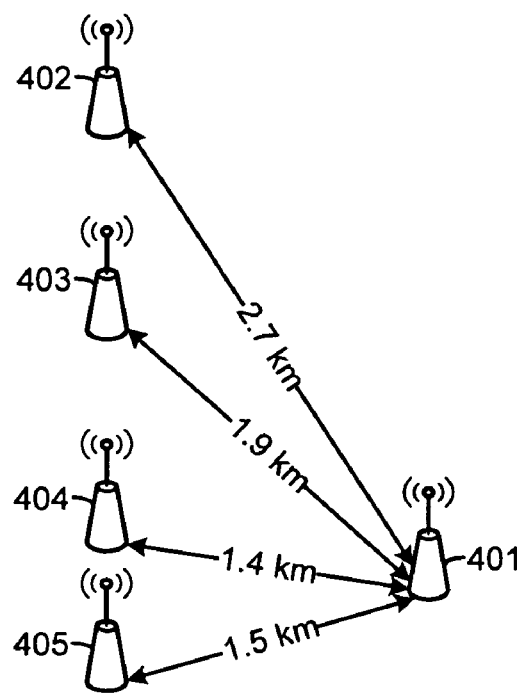
FIG. 4 is a diagram illustrating a total distance to a hub factor.
Figure 4:
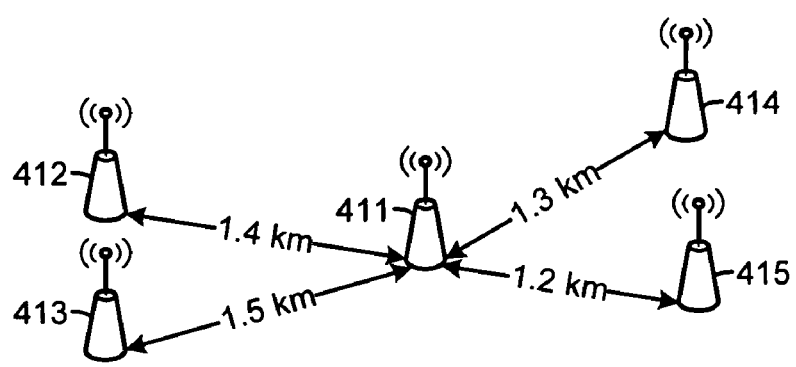

Some of the factors that may be used to generate the hub scores described above will now be discussed in further detail. These factors include a total distance to hub factor, a coverage continuity factor, and a daisy-chain score. FIG. 4 is a diagram illustrating the total distance to a hub factor. FIG. 4 illustrates candidate hub sites 401 and 411. FIG. 4 also shows sites 402-405 and 412-415. Sites 401-405 are eligible to be remotes of site 401. Sites 412-415 are eligible to be remotes of site 411.

Sites 402-405 are 2.7 km, 1.9 km, 1.4 km and 1.5 km from site 401, respectively. Sites 412-415 are 1.4 km, 1.5 km, 1.3 km, and 1.2 km from site 411, respectively. Accordingly, site 401 has a total distance to hub of 7.5 km (2.7+1.9+1.4+1.5=7.5). Site 402 has a total distance to hub of 5.4 km. These distances may be used as a basis for the total distance to hub factors for site 401 and site 411. For example, a total distance to hub factor for site 401 may be calculated as $B_{401}=1/7.5=0.1333$. A total distance to hub factor for site 411 may be calculated as $B_{411}=1/5.4=0.1851$. Since $B_{411}$ is larger than $B_{401}$, a smaller total distance to hub would be favored in the weighted sum hub scoring equation. Thus, based on the total distance to hub factor, site 411 is more likely to be selected as the next hub site than site 401.

Figure 5:
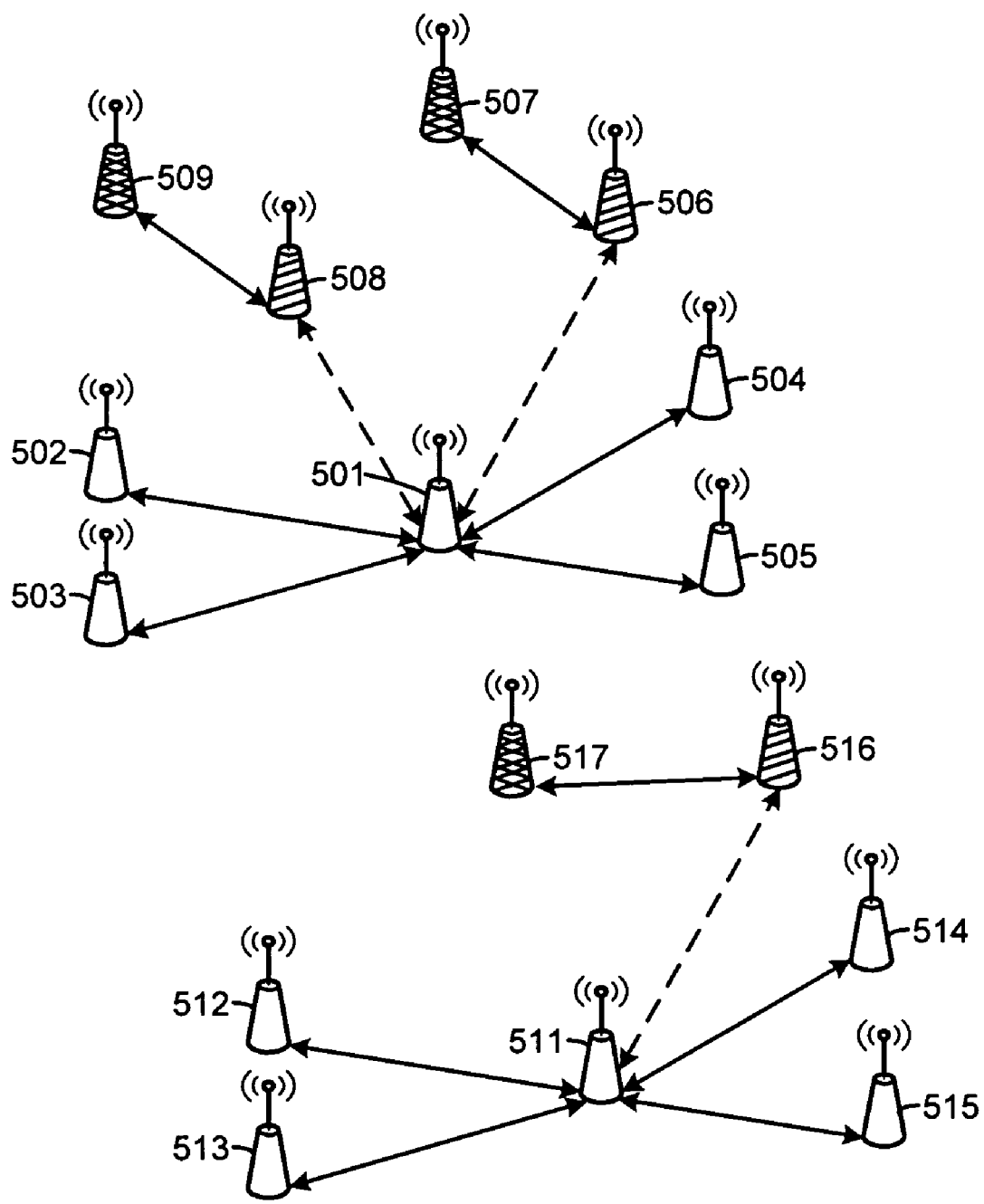
FIG. 5 is a diagram illustrating a coverage continuity factor.

FIG. 5 is a diagram illustrating a coverage continuity factor. FIG. 5 shows candidate hub sites 501 and 511. FIG. 5 also shows sites 502-509 and 512-517. Sites 502-505 are eligible to be remotes of site 501. The lines between site 501 and sites 502-505 represent this. Sites 506 and 508 were eligible to be remotes of site 501. This is represented by the dashed lines between site 501 and sites 506 and 508. Sites 506 and 508 were eligible to be remotes of site 501, except that sites 506 and 508 have already been assigned as remotes of sites 507 and 509, respectively.

Sites 512-515 are eligible to be remotes of site 511. The lines between site 511 and sites 512-515 represent this. Site 516 was eligible to be a remote of site 511. This is represented by the dashed line between site 511 and site 516. Site 516 was eligible to be a remote of site 511, except that site 516 has already been assigned as a remote of site 517.

From FIG. 5, it can be seen that site 501 has two unique hub sites (sites 507 and 509) that have remotes (e.g., site 508 and 506) that were eligible to be remotes of site 501 if those remotes were not already assigned to a hub. It can also be seen that site 511 has only one unique hub site (site 517) that has a remote (e.g., site 516) that was eligible to be a remote of site 511 if that remote were not already assigned to a hub.

The count of these unique hub sites may be used as a basis for a coverage continuity factor for site 501 and site 511. For example, a coverage continuity factor for site 501 may be as simple as a count of the number of unique hub sites described above. In this case, for site 501, the coverage continuity factor would be $C_{501}=2$. For site 511, the coverage continuity factor would be $C_{511}=1$. Since $C_{501}$ is larger than $C_{511}$, the larger number of unique hub sites that were eligible to be a remote of site if that remote were not already assigned to a hub would be favored in the weighted sum hub scoring equation. Thus, based on the coverage continuity factor, site 501 is more likely to be selected as the next hub site than site 511.

Figure 6:
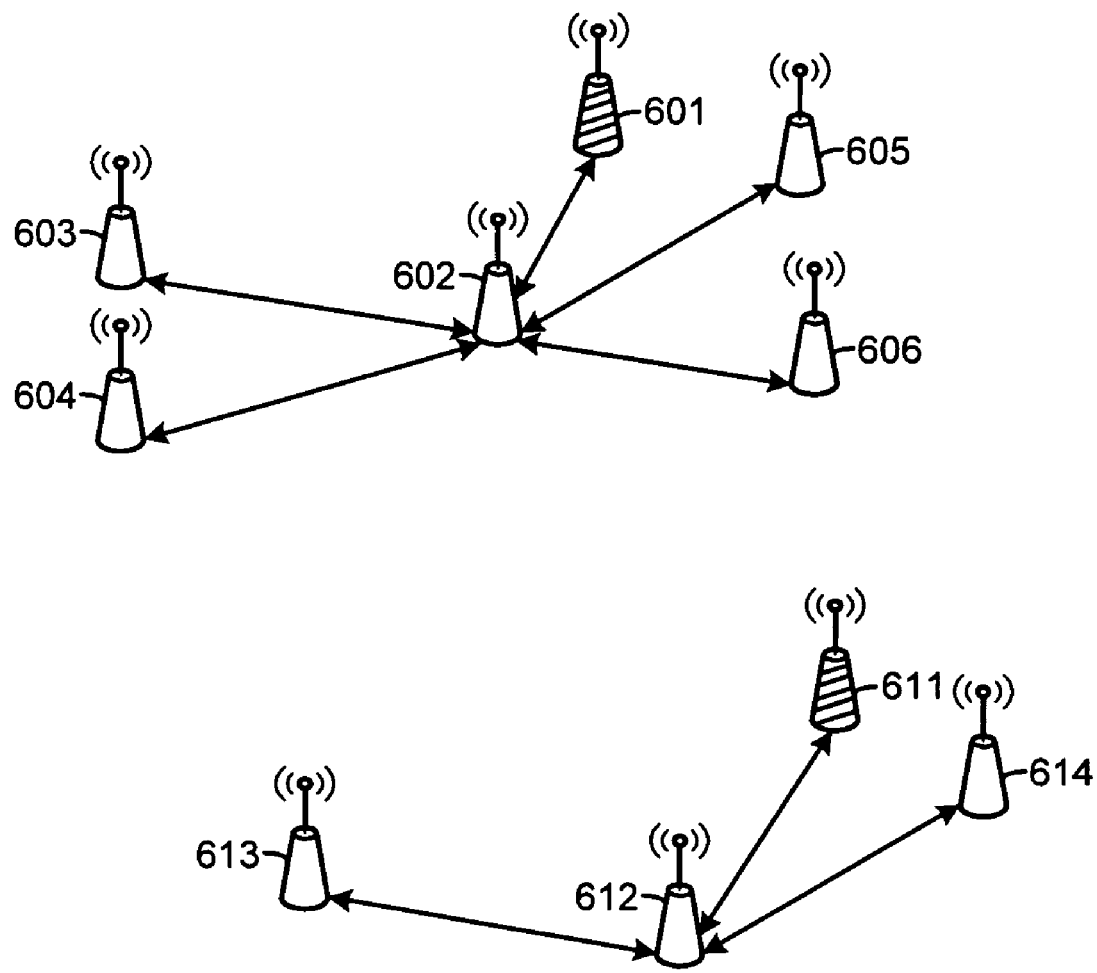
FIG. 6 is a diagram illustrating a first daisy-chain score factor.

FIG. 6 is a diagram illustrating a first daisy-chain score factor. This first daisy-chain score factor may be combined with other daisy-chain score factors in a weighted sum as a basis for a daisy-chain score (e.g., D in the above weighted score equations). For example, daisy-chain score D may be calculated as $D=(F*T)+(G*U)$ where F and G are weighting factors and T and U are first and second daisy-chain score factors, respectively.

FIG. 6 illustrates daisy-chain candidate sites 602 and 612. Daisy-chain candidate sites 602 and 612 are eligible remote sites of hub candidate sites 601 and 611, respectively. The lines between sites 601 and 602 and the line between site 611 and 612 represent this. FIG. 6 also shows sites 603-606 and sites 613-614. Sites 603-606 are eligible to be remotes of site 602. The lines between site 602 and sites 603-606 illustrate this. Sites 613 and 614 are eligible to be remotes of site 612. The lines between site 612 and sites 613 and 614 illustrate this. Thus, it can be seen from FIG. 6 that daisy-chain candidate 602 has four eligible remotes (603-606) and daisy-chain candidate 612 has two eligible remotes (613 and 614).

The count of the eligible remotes for a daisy-chain candidate site may be used as a basis for a first daisy-chain score factor. For example, a first daisy-chain score factor for daisy-chain candidate 602 may be calculated as $T_{602}=1/4=0.25$. A first daisy-chain score factor for daisy-chain candidate 612 may be calculated as $T_{612}=1/2=0.5$. Since $T_{612}$ is larger than $T_{602}$, a smaller number of eligible hubs associated with a daisy-chain candidate would be favored in the weighted sum daisy-chain scoring equation. Thus, based on this first daisy-chain score factor, site 611 is more likely to be selected as a hub than site 601 because site 611's daisy-chain candidate (site 612) has a larger first daisy-chain score factor than site 601's daisy-chain candidate (site 602).

Figure 7:
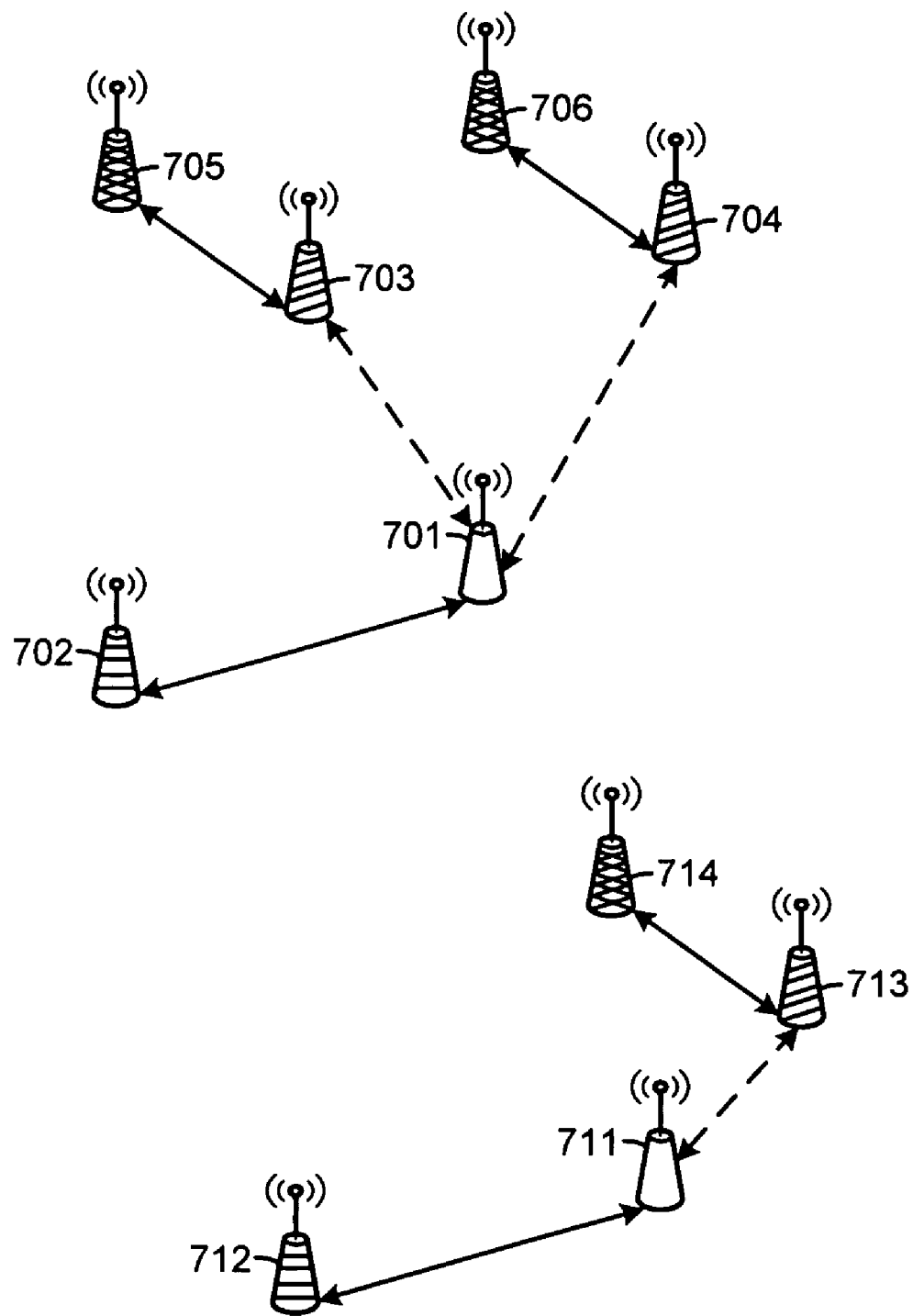
FIG. 7 is a diagram illustrating a second daisy-chain score factor.

FIG. 7 is a diagram illustrating a second daisy-chain score factor. A second daisy chain factor may be based on a coverage continuity factor for the daisy-chain candidate site. Daisy-chain candidate sites 701 and 711 are eligible remote sites of hub candidate sites 702 and 712, respectively. The lines between sites 701 and 702 and the line between site 711 and 712 illustrate this.

FIG. 7 also shows sites 703-706 and 713-714. Sites 703 and 704 were eligible to be remotes of site 701. This is represented by the dashed lines between site 701 and sites 703 and 704. Sites 703 and 704 were eligible to be remotes of site 701, except that sites 703 and 704 have already been assigned as remotes of sites 705 and 706, respectively. Site 713 was eligible to be a remote of site 711. This is represented by the dashed line between site 711 and site 713. Site 713 was eligible to be a remote of site 711, except that site 713 has already been assigned as a remote of site 714.

From FIG. 7, it can be seen that site 701 has two unique hub sites (sites 705 and 706) that have remotes (e.g., sites 703 and 704) that were eligible to be remotes of site 701 if those remotes were not already assigned to a hub. It can also be seen that site 711 has only one unique hub site (site 714) that has a remote (e.g., site 713) that was eligible to be a remote of site 711 if that remote were not already assigned to a hub.

The count of these unique hub sites may be used as a basis for a second daisy-chain score factor for site 701 and site 711. For example, a second daisy-chain score factor for site 701 may be as simple as a count of the number of unique hub sites describe above. In this case, for site 701, the second daisy-chain score factor would be $U_{701}=2$. For site 711, the second daisy-chain score factor would be $U_{711}=1$. This larger number of unique hub sites that were eligible to be a remote of site if the remotes were not already assigned to a hub is favored in the weighted sum daisy-chain scoring equation. By extension, this larger number is also favored in the hub scoring equation. Thus, based on this second daisy-chain score factor, site 702 is more likely to be selected as a hub than site 712 because site 702's daisy-chain candidate (site 701) has a larger second daisy-chain score factor than site 712's daisy-chain candidate (site 711).

The methods, systems, networks, sites, and base stations described above may be implemented with, contain, or be executed by one or more computer systems. The methods described above may also be stored on a computer readable medium. Many of the elements of design system 100 may be, comprise, or include computers systems. Network design 116 may be store or displayed by a computer. This includes, but is not limited to: design system 100; hub score generator 106; hub selection 108; and remote selection 110.

Figure 8:
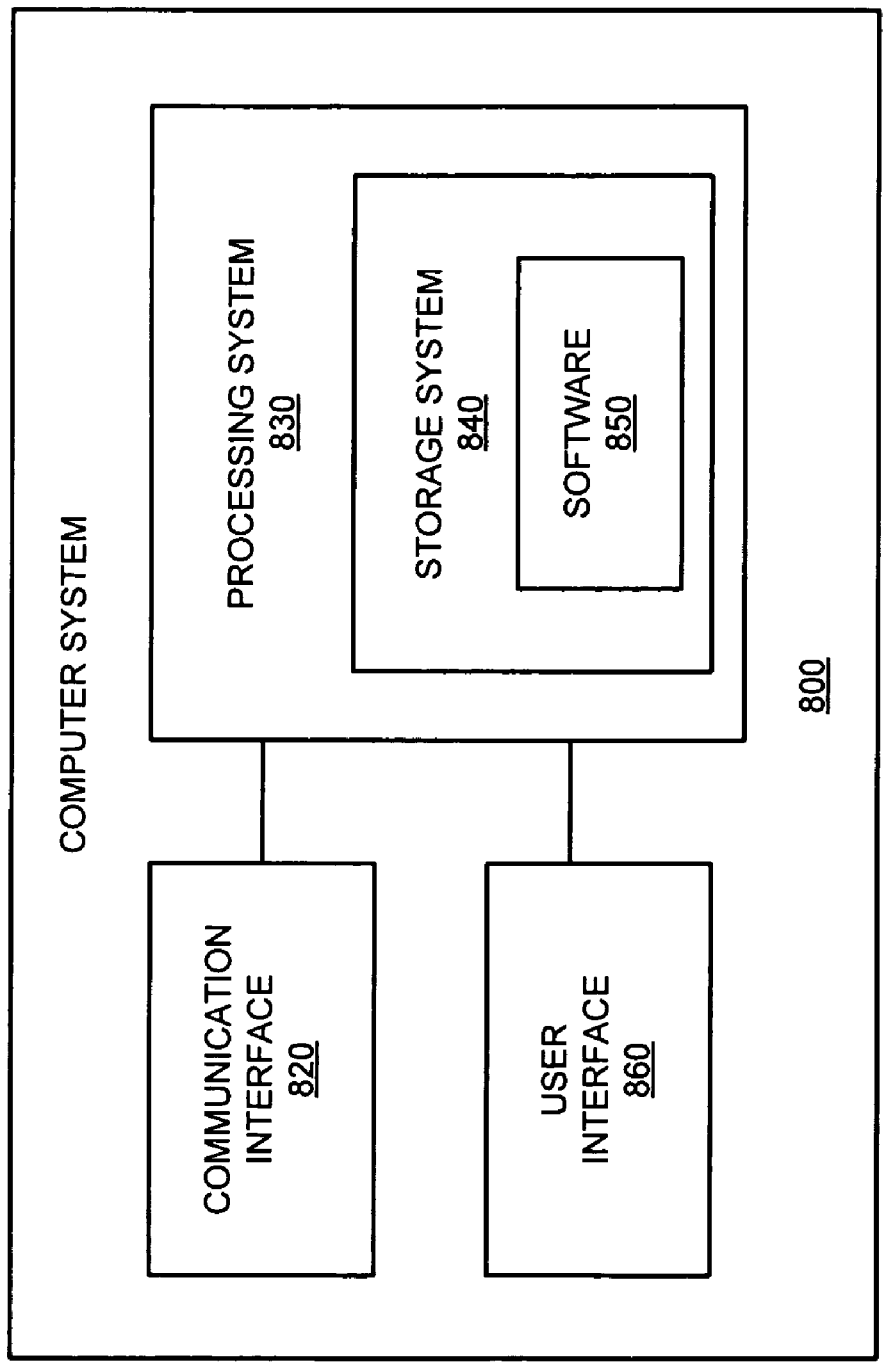
FIG. 8 is a block diagram of a computer system.

FIG. 8 illustrates a block diagram of a computer system. Computer system 800 includes communication interface 820, processing system 830, and user interface 860. Processing system 830 includes storage system 840. Storage system 840 stores software 850. Processing system 830 is linked to communication interface 820 and user interface 860. Computer system 800 could be comprised of a programmed general-purpose computer, although those skilled in the art will appreciate that programmable or special purpose circuitry and equipment may be used. Computer system 800 may be distributed among multiple devices that together comprise elements 820-860.

Communication interface 820 could comprise a network interface, modem, port, transceiver, or some other communication device. Communication interface 820 may be distributed among multiple communication devices. Processing system 830 could comprise a computer microprocessor, logic circuit, or some other processing device. Processing system 830 may be distributed among multiple processing devices. User interface 860 could comprise a keyboard, mouse, voice recognition interface, microphone and speakers, graphical display, touch screen, or some other type of user device. User interface 860 may be distributed among multiple user devices. Storage system 840 could comprise a disk, tape, integrated circuit, server, or some other memory device. Storage system 840 may be distributed among multiple memory devices.

Processing system 830 retrieves and executes software 850 from storage system 840. Software 850 may comprise an operating system, utilities, drivers, networking software, and other software typically loaded onto a computer system. Software 850 could comprise an application program, firmware, or some other form of machine-readable processing instructions. When executed by processing system 830, software 850 directs processing system 830 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of selecting network hubs and remotes, comprising:
   receiving site location information for a first list of sites;
   receiving eligible remote information for the first list of sites;
   generating a first plurality of hub scores for sites in the first list of sites;
   selecting a first hub based on a first hub score that is a member of the first plurality of hub scores, is associated with a first site and includes a weighting factor that is based on a daisy-chain score factor for a second site, wherein the daisy-chain score factor varies inversely to the number of other sites that are eligible to be remotes of the second site; and,
   assigning a first plurality of remotes to the first hub.

2. The method of claim 1, further comprising:
   removing the first hub and the first plurality of remotes from the first list of sites to create a second list of sites;
   removing the first hub and the first plurality of remotes from a list of eligible remotes;
   generating a second plurality of hub scores for sites in the second list of sites; and,
   selecting a second hub based on a second hub score that is a member of the second plurality of hub scores and is associated with the second site.

3. The method of claim 1, wherein the member of the first plurality of hub scores further includes a first weighting factor that is based on a number of sites that are eligible to be remotes of the first site.

4. The method of claim 1, wherein the member of the first plurality of hub scores further includes a weighting factor that is based on a total distance to a plurality of sites that are eligible to be remotes of the first site.

5. The method of claim 1, wherein the member of the first plurality of hub scores further includes a weighting factor that is based on the number of unique hub sites that have remotes that were eligible to be remotes of the second site if those remotes were not already assigned to a hub.

6. A system for generating a backhaul design, comprising:
   a hub score generator that generates a first plurality of hub scores for sites in a first list of sites;
   a hub selector that selects a first hub based on a first hub score that is a member of the first plurality of hub scores, is associated with a first site and includes a weighting factor that is based on a daisy-chain score factor for a second site, wherein the daisy-chain score factor varies proportionally to the number of unique hub sites that have remotes that were eligible to be remotes of the second site if those remotes were not already assigned to a hub; and,
   a remote selector that assigns a first plurality of remotes to the first hub.

7. The system of claim 6, wherein the hub score generator generates a second plurality of hub scores for sites in the second list of sites; and,
   wherein the hub selector selects a second hub based on a second hub score that is a member of the second plurality of hub scores and is associated with the second site.

8. The system of claim 6, wherein the member of the first plurality of hub scores further includes a first weighting factor that is based on a number of sites that are eligible to be remotes of the first site.

9. The system of claim 6, wherein the member of the first plurality of hub scores further includes a weighting factor that is based on a total distance to a plurality of sites that are eligible to be remotes of the first site.

10. The system of claim 6, wherein the member of the first plurality of hub scores further includes a weighting factor that is based on the number of unique hub sites that have remotes that were eligible to be remotes of the second site if those remotes were not already assigned to a hub.

11. A non-transitory computer readable medium having instructions stored thereon for selecting network hubs and remotes that, when executed by a computer, at least direct the computer to:
   receive site location information for a first list of sites;
   receive eligible remote information for the first list of sites;
   generate a first plurality of hub scores for sites in the first list of sites;
   select a first hub based on a first hub score that is a member of the first plurality of hub scores, is associated with a first site and includes a weighting factor that is based on a daisy-chain score factor for a second site, wherein the daisy-chain score factor varies inversely to the number of other sites that are eligible to be remotes of the second site; and, assign a first plurality of remotes to the first hub.

12. The non-transitory computer readable medium of claim 11, having instructions stored thereon that at least further direct the computer to:

remove the first hub and the first plurality of remotes from the first list of sites to create a second list of sites;

remove the first hub and the first plurality of remotes from a list of eligible remotes;

generate a second plurality of hub scores for sites in the second list of sites; and, select a second hub based on a second hub score that is a member of the second plurality of hub scores and is associated with the second site.

13. The non-transitory computer readable medium of claim 11, wherein the member of the first plurality of hub scores further includes a first weighting factor that is based on a number of sites that are eligible to be remotes of the first site.

14. The non-transitory computer readable medium of claim 11, wherein the member of the first plurality of hub scores further includes a weighting factor that is based on a total distance to a plurality of sites that are eligible to be remotes of the first site.

15. The non-transitory computer readable medium of claim 11, wherein the member of the first plurality of hub scores further includes a weighting factor that is based on the number of unique hub sites that have remotes that were eligible to be remotes of the second site if those remotes were not already assigned to a hub.

* * * * *